Jan. 24, 1967  H. RUSSELL, JR  3,299,731
GIMBAL-TYPE JOYSTICK
Filed April 7, 1964

HOWARD RUSSELL JR
*INVENTOR.*

BY
*Thomas W. Kennedy*
ATTORNEY

United States Patent Office 3,299,731
Patented Jan. 24, 1967

3,299,731
GIMBAL-TYPE JOYSTICK
Howard Russell, Jr., Arcadia, Los Angeles, Calif., assignor to General Precision Inc., Little Falls, N.J., a corporation of Delaware
Filed Apr. 7, 1964, Ser. No. 357,868
3 Claims. (Cl. 74—471)

The present invention relates to gimbal-type joysticks and particularly to a gimbal-type joystick which eliminates shifting of its dead-center position.

One problem with a conventional, gimbal-type, hand-control joystick, such as are used in tracking systems and similar, remotely operated systems, is the difficulty in providing a non-shiftable, built-in, dead zone to which the joystick can automatically return when released.

High performance systems using this type of conventional joystick cannot tolerate slight errors in the output intelligence caused by axial misalignment of the joystick while in its dead-center position, i.e., variations in the neutral or zero position to which the joystick returns when released.

In accordance with one embodiment of the invention, a joystick is mounted in a 2-gimbal Cardanic suspension and errors in the output intelligence due to lever dead-center misalignment are eliminated by using a spring adjacent to the first gimbal and by using a second spring adjacent to the second gimbal for urging the first and second gimbals to their null positions, and also by providing a latch next to each spring to engage and restrain the spring once its gimbal reaches its null position.

Accordingly, it is one object of the invention to eliminate joystick dead-center misalignment in a gimbal-type joystick unit.

It is another object of the invention to provide a gimbal-type joystick unit completely enclosed in an air-tight housing and having a hand-operated lever with identical spring-rate effect in all radial directions.

It is a further object of the invention to provide a joystick unit with a stiff-stick hand control having zero-backlash, infinite resolution and instantaneous response.

To the fulfillment of these and other objects, the invention provides a joystick unit including a hand-operated lever and a gimbal system for supporting the lever. The gimbal system has an inner gimbal pivotable about an inner axis perpendicular to the longitudinal axis of the lever and having a fixed connection to one end of the lever. The gimbal system includes an outer gimbal pivotable about an outer axis perpendicular to the inner axis. The lever axis, inner axis, and outer axis intersect substantially at a reference point through which a fixed reference axis extends perpendicular to the inner axis. The inner gimbal has a first spring means urging the inner gimbal to a null position with the lever axis substantially at right angles to the outer axis, and has a first latch means engaging and restraining the first spring means when the inner gimbal is in its null position. The outer gimbal has a second spring means urging the outer gimbal to a null position with the inner axis substantially at right angles to the reference axis, and has a second latch engaging and restraining the second spring means when the outer gimbal is in its null position. With this construction, the lever when released, is automatically returned to its dead-center position with its lever axis aligned with the fixed reference axis.

Other objects of the invention will become apparent upon reading the annexed detailed description in connection with the drawings wherein like parts are designated by like numerals throughout the several views, and wherein.

Figure 1:
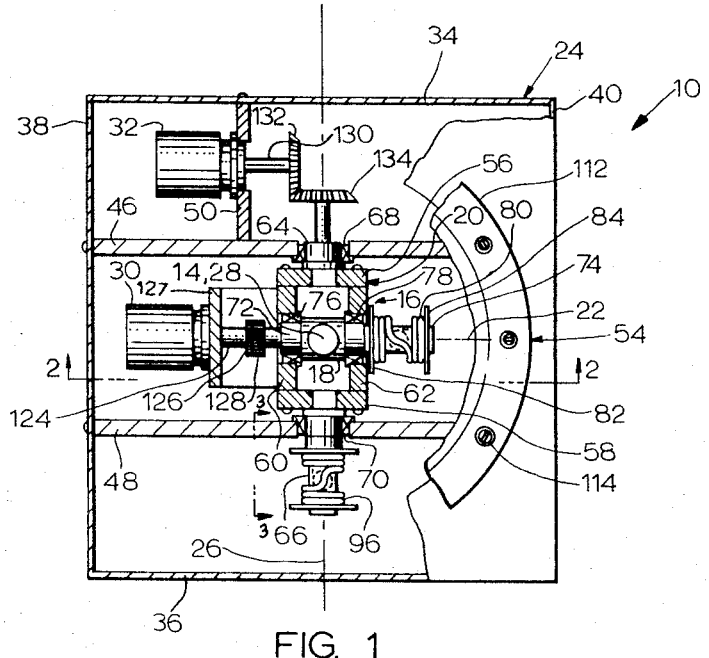
FIGURE 1 is a sectional view of a joystick unit embodying features of the present invention.
Figure 2:
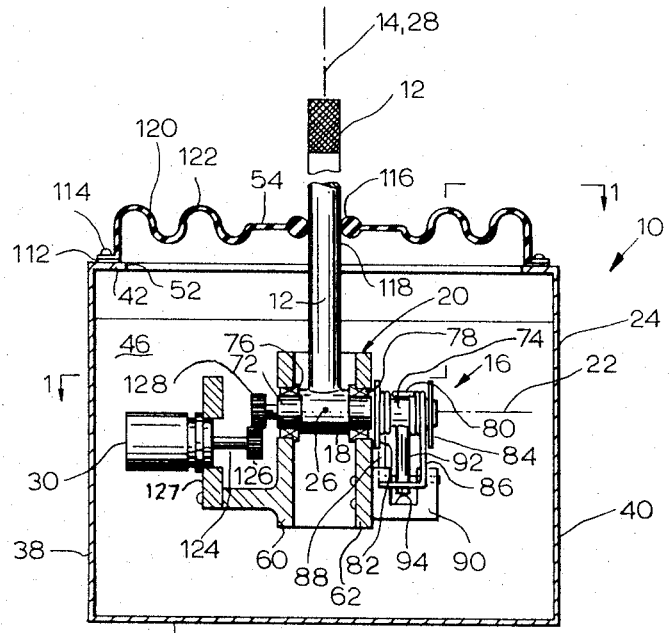
FIGURE 2 is a sectional view as taken on line 2—2 of FIGURE 1.
Figure 3:
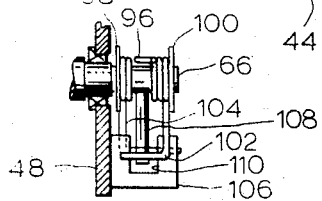
FIGURE 3 is a sectional view as taken on line 3—3 of FIGURE 1.

Referring to the drawings, one embodiment of the present invention is a joystick unit 10 comprising a joystick lever 12 having a longitudinal axis 14, and a Cardanic suspension or gimbal system 16 for supporting lever 12 for pivotal movement about two mutually perpendicular axes.

In the illustrated embodiment, suspension system 16 is a two-gimbal unit. The first or inner gimbal 18 takes the form of a trunnion-like shaft rigidly fixed to the lower end of lever 12 with its longitudinal axis 22 perpendicular to lever axis 14. The second or outer gimbal 20 of system 16 is a box frame member which journals the ends of gimbal shaft 18 for pivotal movement about shaft axis 22 and which, in turn, is journaled in a fixed case or housing structure 24 for pivotal movement about a second pivotal axis 26 coplanar with and perpendicular to axis 22. In its neutral or zero position, lever 12 has its longitudinal axis 14 coincident with a reference axis 28 perpendicular to the plane of axes 22 and 26 at the intersection of said axes. The frame of reference for axis 28 is the housing 24 and, as will be seen as this description proceeds, lever axis 14 automatically returns to a position of alignment with reference axis 28 when joystick lever 12 is released during hand operation.

Frame member 20 supports a first sensor or transducer 30, which is operatively connected to shaft 18 for measuring rotation of shaft 18 relative to frame 20 and housing 24 supports a second sensor or transducer 32, which is operatively connected to frame 20 for measuring rotation of frame 20 relative to housing 24.

Housing 24 has four side walls 34, 36, 38, 40, which form an enclosure around gimbal system 16. Housing 24 also has walls 42, 44 at the top and bottom of the housing, axially spaced along axis 28. Within housing 24 are a pair of spaced support walls 46, 48 arranged parallel to side walls 34, 36 for supporting outer gimbal 20. Housing 24 also contains an internal support wall 50 which extends between side wall 34 and wall 46 for supporting sensor 32. Top wall 42 has an opening 52 through which lever 12 extends with ample clearance for substantial lateral movement. To this end, opening 52 preferably is circular in configuration and concentric about axis 28. A sealing means 54, which is preferably a rubber boot or the like, seals opening 52 thus rendering housing 24 an air-tight enclosure for the gimbal system.

Frame 20 is formed of walls 56, 58, 60, 62, with walls 56, 58 preferably parallel to each other and parallel to housing walls 46 and 48.

Frame 20 has a first stub shaft or journal 64 integral with and projecting axially outwardly from wall 56; and has a second stub shaft or journal 66 integral with and projecting axially outwardly from wall 58, the shafts 64, 66 being co-axial with each other along axis 26. Wall 46 has an anti-friction bearing 68 in which shaft 64 is journaled; and wall 48 has a similar anti-friction bearing 70, in which shaft 66 is journaled for rotation of frame 20 relative to housing 24. Bearings 68, 70 are co-axial with each other and with journals 64, 66 along axis 26.

Shaft 18 has two shaft portions or journals 72, 74, which are axially spaced along axis 22. Frame wall 60 has an anti-friction bearing 76 in which shaft portion 72 is journaled; and frame wall 62 has an anti-friction bearing 78, in which shaft portion 74 is journaled. Bearings 76, 78 are co-axial with each other and with shaft 18 along axis 22.

Shaft portion 74 has a first spring means or coil spring 80, which engages wall 62 for urging shaft 18 to a null position with axis 14 substantially at right angles to axis 26. Coil spring 80 is preferably a wire coil, which is wrapped around the radially outer surface of shaft portion 74. Shaft portion 74 has two washer plates 82, 84, which are axially spaced on either side of coil 80 and fixed to the outer surface of shaft portion 74 for positioning said coil 80 in an axial direction. Coil 80 has two end portions 86, 88, each having an L-shape with one leg extending tangentially from the rest of the coil in a radially outward direction and with the other leg extending substantially parallel to the coil spring and shaft axis 22. The wire ends 86, 88, each has a sufficient spring rate to cause a compressive force against the other when in contact with each other and to cause a still greater compressive force toward each other when separated slightly by a gap therebetween.

Frame 20 has a first centering means including a stop plate or abutment 90 fixed to and projecting axially outwardly from wall 62 adjacent to spring 80; abutment 90 is disposed and compressively gripped between coil ends 86, 88. Abutment member 90 holds one end 86 or 88 fixed when the other end is rotated about axis 22 and is engaged by both ends 86, 88 when shaft 18 is in a null position with axis 14 substantially at right angles to axis 26.

Shaft portion 74 has a pin portion 92 extending radially outwardly therefrom substantially at right angles to axis 22, said pin 92 preferably being of cylindrical shape. Pin 92 is disposed between wire ends 86 and 88 so that when shaft 18 is turned, one wire end 86 or 88 is turned by the shaft and the other wire end 88 or 86 is held fixed by plate 90. Plate 90 also has a cut-out portion or slot or opening 94 to prevent interference between pin 92 and plate 90. Slot 94 has a width in an axial direction which is greater than the diameter of pin 92, the width also being less than the distance between the radial legs of coil ends 86, 88. Plate 90 is preferably equal in thickness to the diameter of pin 92, so that when shaft 18 is in a null position, wire ends 86 and 88 bear against both plate 90 and pin 92. In this way, any play or backlash in shaft 18 and its lever 12 is substantially avoided. In addition, spring 80 urges shaft 18 to return to a null position when released during hand operation, wherein axis 14 is substantially at right angle to axis 26.

A second spring means or coil spring 96, which is preferably of substantially identical construction to spring 80 engages stub shaft 66 and wall 48 for urging frame 20 to a null position relative to housing 24, wherein axis 22 is substantially at right angles to axis 28. Spring 96 is similarly wrapped around the radially outer surface of its shaft 66, and has two washer plates 98, 100 similarly fixed thereto for positioning coil 96. Coil 96 also has two L-shaped end portions 102, 104 similar in construction to those of spring 80. Wall 48 has a second latch means for stop plate 106 integral with and projecting axially outwardly therefrom. Plate 106 is also disposed between end portions 102, 104 and engages said portions when frame 20 is in a null position, wherein axis 22 is substantially at right angle to axis 28.

Stub shaft 66 also has a similar pin portion 108 extending radially outwardly therefrom and disposed between wire end portions 102, 104. Plate 106 also has a similar slot 110 through which pin 108 can pass without interference. With this construction, spring 96 urges stub shaft 66 and frame 20 to return to its null position when released during hand operation. In addition, coils 80 and 96 can have substantially the same spring rate providing a substantially identical spring rate in all radial directions on lever 12.

Sealing boot 54 has a peripheral edge portion 112 sealingly overlapping the edge of opening 52 and being fixedly joined thereto by threaded fasteners 114 or the like. Boot 54 has a radially inner portion forming an opening 116 through which lever 12 extends substantially coaxially therewith. The edge of opening 116 engages the adjacent outer surface 118 of lever 12. Boot 54 has a plurality of annular corrugations 120, 122, which are substantially concentric about axis 28 when opening 116 is in its dead-center position. Corrugations 120, 122 form a resilient portion in boot 54, having a substantially identical spring rate in all radial directions, thereby acting in cooperation with the spring rate effect of coil springs 80 and 96.

Sensors 30 and 32 are preferably conventional electromechanical transducers, such as voltmeters, synchro transmitters, or the like. Sensor 30 has a shaft 124 with an integral pinion gear 126, and is supported by an L-shaped, integral, projecting portion 127 of wall 60. Shaft portion 72 has a pinion gear 128 in mesh with pinion gear 126 so that sensor 30 can measure the rotation of shaft 18 from its null position. Sensor 32 which is supported from housing wall 50, has a shaft 130 with an integral bevel gear 132. Stub shaft 64 has a matching bevel gear 134 in mesh with bevel gear 132, whereby sensor 32 can measure the rotation of frame 20 from its null position. With such interconnecting gearing 132, 134, 126, 128, the calibration of gimbal sensors 30 and 32 with respect to the null positions of shaft 18 and frame 20 and with respect to the dead-center position of lever 12 can be facilitated.

In operation, the lever is normally grasped by the hand, or grasped by the fingers in miniature units, and the lever is pivoted about its pivot point. The torque and proportional movement of the lever is automatically resolved vectorially by the suspension system into a separate torque and proportional movement about each axis which is then transmitted by each axial transducer to an outside receiver for vectorial re-resolution as desired. With a uniform, radial spring rate, the operator senses only a radial resistance to positioning of the lever. At the termination of the manual operation, the lever upon release is automatically positioned at dead-center position which is so indicated by the transducers.

While the present invention has been described in a preferred embodiment, it will be obvious to those skilled in the art that various modifications can be made therein within the scope of the invention; and it is intended that the appended claims cover all such modifications.

What is claimed is:

1. A joystick unit comprising:
   a support structure;
   an outer gimbal member journaled in said support structure for angular displacement about a first axis;
   an inner gimbal member journaled in said outer gimbal member for angular displacement about a second axis orthogonal to said first axis;
   a control lever rigidly projecting from said inner gimbal member along a third axis orthogonal to, and passing through the intersection of, said first and second axes;
   an abutment member fixedly mounted with respect to said support structure;
   centering spring means and a projection on said outer gimbal member coacting with said abutment member to bias the outer gimbal member resiliently to a first position of zero angular displacement about said first axis;

a second abutment member fixedly mounted with respect to said outer gimbal member; and second centering spring means and a projection on said inner gimbal member coacting with said second abutment member to bias the inner gimbal member resiliently to a position of zero angular displacement about said second axis.

2. A joystick unit according to claim 1, including:

a rotary transducer mounted on said support structure and operatively coupled to said outer gimbal member to sense angular displacement of said outer gimbal member relative to said support structure about said first axis; and a second rotary transducer mounted on said outer gimbal and operatively coupled to said inner gimbal to sense angular displacement of the inner gimbal relative to the outer gimbal about said second axis.

3. A joystick unit comprising:

a support structure including coaxially aligned journal bearings defining a first axis;

an outer gimbal member having a pair of coaxially aligned journals received in said journal bearings and supporting the outer gimbal member on said support structure for angular displacement relative thereto about said first axis, the journals having respective end portions extending through the bearings;

coaxially aligned journal bearings in said outer gimbal member defining a second axis orthogonal to said first axis;

an inner gimbal member having a pair of coaxially aligned journals received in the outer gimbal journal bearings and supporting the inner gimbal member on the outer gimbal member, for angular displacement relative thereto about said second axis, the inner gimbal member journals having respective end portions extending through the outer gimbal journal bearings and terminating externally of the outer gimbal member;

a control lever rigidly projecting from said inner gimbal member along a third axis orthogonally related, and passing through the intersection of, said first and second axes;

a centering spring mounted on the respective projecting end portion of one of said inner gimbal member journals and outer gimbal member journals, each spring including a coil portion encircling the journal end portion and a pair of closely-spaced tangential extensions;

a radial projection on each said end portion of said journals substantially co-extensive in length with the tangential extensions of said centering springs and normally disposed between the extensions of the respective springs;

an abutment member, mounted on said outer gimbal member, constructed and arranged to coact with the radial projection and centering spring extensions on the end portion of said one journal of the inner gimbal member to resiliently bias the inner gimbal member to a position of zero displacement about said second axis;

a second abutment member, fixedly mounted with respect to said support structure, constructed and arranged to coact with the radial projection and centering spring extensions on the end portion of said one journal of the outer gimbal to resiliently bias the outer gimbal member to a position of zero angular displacement about said first axis;

a rotary transducer mounted on said support structure;

a second rotary transducer mounted on said outer gimbal member;

rotary drive means operatively coupling the first transducer to the end portion of the other journal of the outer gimbal member to sense angular displacement of the outer gimbal member relative to the support structure about said first axis; and rotary drive means operatively coupling the second transducer to the end portion of the other journal of the inner gimbal member to sense angular displacement of the inner gimbal member relative to the outer gimbal member about said second axis.

References Cited by the Examiner

UNITED STATES PATENTS

| | | | |
|---|---|---|---|
| 2,337,166 | 12/1943 | Overbeke | 74—471 X |
| 2,396,309 | 3/1946 | Wodal | 74—471 X |
| 2,477,574 | 8/1949 | Braddon. | |
| 2,700,106 | 1/1955 | Taylor. | |
| 3,095,754 | 7/1963 | Mayon et al. | 74—471 |
| 3,128,635 | 4/1964 | Doolittle | 74—471 |
| 3,131,574 | 5/1964 | Clingerman | 74—471 |
| 3,179,755 | 4/1965 | Burnham | 74—471 X |

FRED C. MATTERN, JR., *Primary Examiner.*

C. F. GREEN, *Assistant Examiner.*